United States Patent [19]

Buonomo et al.

[11] Patent Number: 4,628,445

[45] Date of Patent: Dec. 9, 1986

[54] APPARATUS AND METHOD FOR SYNCHRONIZATION OF PERIPHERAL DEVICES VIA BUS CYCLE ALTERATION IN A MICROPROCESSOR IMPLEMENTED DATA PROCESSING SYSTEM

[75] Inventors: Joseph P. Buonomo; Raymond E. Losinger, both of Endicott; Burton L. Oliver, Nanticoke; Daniel J. Sucher, Vestal, all of N.Y.

[73] Assignee: International Business Machines Corporation, Armonk, N.Y.

[21] Appl. No.: 848,620

[22] Filed: Apr. 7, 1986

Related U.S. Application Data

[63] Continuation of Ser. No. 542,934, Oct. 18, 1983, abandoned.

[51] Int. Cl.⁴ ............................................. G06F 13/42
[52] U.S. Cl. ..................................... 364/200; 364/900
[58] Field of Search ... 364/200 MS File, 900 MS File

[56] References Cited

U.S. PATENT DOCUMENTS

| 3,500,466 | 3/1970 | Carleton | 364/200 |
| 3,978,455 | 8/1976 | Valassis | 364/200 |
| 4,050,097 | 9/1977 | Miu | 364/200 |
| 4,156,932 | 5/1979 | Robinson | 364/200 |
| 4,394,727 | 7/1983 | Hoffman | 364/200 |
| 4,404,628 | 9/1983 | Angelo | 364/200 |
| 4,426,679 | 1/1984 | Yu | 364/200 |
| 4,449,196 | 5/1984 | Pritchard | 364/900 |

Primary Examiner—Raulfe B. Zache
Assistant Examiner—Florin Munteanu
Attorney, Agent, or Firm—John H. Bouchard

[57] ABSTRACT

Synchronization of peripheral operation with that of a processor in a multi-microprocessor implemented data processing system is achieved by bus cycle alteration. A logic circuit is provided for monitoring the condition of a peripheral's status bits and for preventing an appropriate processor control signal from completing the present bus cycle if the peripheral of interest is not able to accept an access. The peripheral of interest is readily identified by providing unique memory mapped locations, one for each system peripheral, that are responsively connected to the logic circuit.

5 Claims, 2 Drawing Figures

APPARATUS AND METHOD FOR SYNCHRONIZATION OF PERIPHERAL DEVICES VIA BUS CYCLE ALTERATION IN A MICROPROCESSOR IMPLEMENTED DATA PROCESSING SYSTEM

This is a continuation of application Ser. No. 542,934, filed Oct. 18, 1983, now abandoned.

BACKGROUND OF THE INVENTION

1. Field of the Invention

This invention is concerned with synchronization of peripheral devices in a multi-microprocessor implemented data processing system that emulates a mainframe system. More particularly, this invention is directed to optimizing the performance of such a system insofar as peripheral synchronization without device polling is concerned.

2. Description of the Prior Art

The emulation of "mainframe" data processing systems through the use of microprocessors has become a reality. A typical main frame data processing system would be any one of the System/370 (S/370) models available from International Business Machines Corporation. The Personal Computer XT/370, a "desktop" System/370, also available from International Business Machines Corporation, is one example of such a microprocessor implemented main frame. This particular desktop system is a hardware/software package that allows one to run System/370 application programs in a single user environment, to run as a terminal attached to a main frame host or to run in a stand-alone mode as a personal computer, as required by the particular application. There are, of course, similar systems available from other manufacturers, all of which systems incorporate many of the same functions as the Personal Computer XT/370 although the manner and means of implementation does differ, in varying degrees, from system to system.

Due to revolutionary advances in chip densities and packaging, which have been accompanied by significant reductions in costs, many main frame features can now be implemented directly in a desktop system, while other features require some hardware and/or software assistance in order to make them available. The introduction and use of more powerful microprocessors such as, for example, the 8086 and 8088 from Intel Corporation and the 68000 from Motorola Corporation, added further to the list of functions it would be possible to implement in a desktop mainframe. This new breed of microprocessors is fully capable of running a large, enriched instruction set, such as that of System/370, although several of these microprocessors, working in concert with the aid of additional hardware and/or software support, would be required to effect instruction execution in an acceptable time period. It will also be appreciated that presently available microprocessors, while remarkable for the functions they do offer, are not capable of providing all mainframe capability without system compromise.

Thus, as in all data processing system designs, various trade-offs are made in order to optimize the price and performance of these microprocessor implemented desktop mainframes. One particular trade-off problem is posed by the need or desire to utilize certain mainframe functions and features that would be particularly difficult to provide in a microprocessor implemented desktop mainframe. Another type of trade-off problem is posed by the requirement that all architectural constraints of the emulated mainframe be adhered to so that user programs can be run without concern. One specific implementation problem of concern, due in part to such trade-offs being made, is that of synchronizing the operation of the microprocessor in control or host processor with that of a peripheral device.

Typically, this task is handled by having the host processor access a peripheral, poll its status bits to determine when the peripheral has completed its operation and read any resulting information. The polling function is generally implemented by a microcode loop which reads the status bits of the peripheral being used and then branches, if appropriate, on the results. However, this approach has several drawbacks, particularly in a microprocessor implemented system.

The polling microcode is extra code that must be written and debugged. For performance purposes, the polling microcode is generally resident in the host processor's control store. Thus, it is essential that the microcode be error free since it is virtually impossible to change or patch. In addition, in a microprocessor implemented system, the polling microcode would be permanently loaded into the processor's on-chip control store, which represents a very limited and valuable system resource that could be put to other functional use. In fact, the control storage space taken by polling microcode prevents the use of that space for other code that might have a more beneficial impact on system performance.

The use of polling logic and support therefor may also incur a performance penalty in the system. The processor must execute a loop to constantly monitor the status of the peripheral device in which it is interested. This loop requires a bus cycle to read the peripheral's status bits and a number of internal operations to determine if peripheral access is complete. With the host processor in a microcode loop, if completion of peripheral operation occurs just after its status bits are read, detection of this fact will be delayed until the next loop iteration. Hence, each time a peripheral is accessed, the time required to execute a single loop may be added to the total access time for a particular peripheral. In a microprocessor implemented mainframe, this can result in system performance degradation if the peripheral is a high usage device. Thus, while it would be possible to utilize microcode implemented peripheral synchronization via polling in a microprocessor implemented mainframe data processing system, the performance and/or control storage penalties associated with that solution to the problem are not acceptable.

OBJECTS AND SUMMARY OF THE INVENTION

Accordingly, it is a principal object of the present invention to provide an apparatus and a method that will permit a multi-microprocessor implemented mainframe data processing system having limited control storage to optimally effect synchronization between the processor in control of the system and a peripheral device.

It is also a principal object of the present invention to provide such an apparatus and methodology in such a system without the use of microcode based polling of peripheral devices.

It is a further object of the present invention to provide an apparatus and a method for controlling peripheral synchronization by altering the bus cycle of such a system.

These and other objects of the present invention are achieved in a multi-microprocessor implemented mainframe emulated data processing system by bus cycle alteration to achieve peripheral and processor synchronization. A logic circuit is provided for monitoring the condition of a peripheral's status bits and for preventing an appropriate processor control signal, the data acknowledgement signal, from completing the present bus cycle if the peripheral of interest is not able to accept an access. The peripheral of interest is readily identified by providing unique memory mapped locations, one for each system peripheral, that are responsively connected to the logic circuit. Only one microword, rather than the many needed to support a polling synchronization technique, is used in the present invention.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

The present invention is to be explained in the context of a mainframe desktop system that has been implemented with at least two microprocessors. More particularly, this resultant system has been adapted to emulate a System/370 mainframe. For those requiring further information on the instruction set of this mainframe and details of System/370 functions, reference should be made to the IBM System/370 Principles Of Operation (Manual No. GA22-7000), which is available from the IBM Corporation and which is, to the extent necessary, incorporated herein by reference. In addition, those requiring further information on the details of the desktop mainframe referred to herein should refer to Technical Reference Manual For The IBM Personal Computer XT/370 (Manual No. 6936732).

It will be understood by those having skill in this art that mainframe implementation can be achieved by use of only a single microprocessor. Alternatively, a plurality of microprocessors, equal to or different than the number used herein, could be employed to emulate a mainframe system. Further divergence in system configuration is possible as a result of the variations in instruction set partitioning schemes and the manner in which the subsets are then emulated. Examples of this multiple microprocessor implementation approach are more completely described in commonly assigned U.S. patent application Ser. No. 371,634, filed in the names of Agnew et al on Apr. 26, 1982. In Agnew et al, a System/370 instruction set is partitioned in accordance with several criteria and the subsets thereof are each implemented on one or more of a plurality of microprocessors, but not all necessarily in the same manner.

Figure 1:
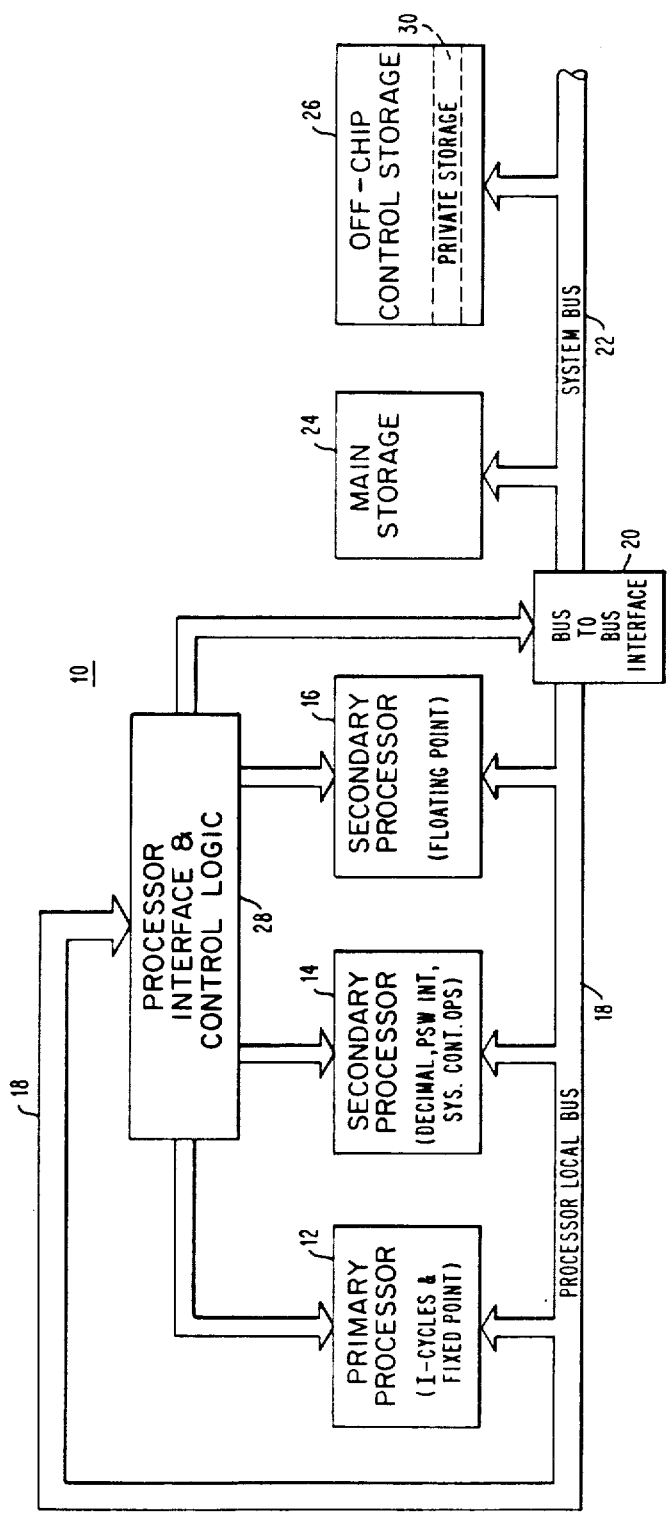
FIG. 1 schematically illustrates a simplified block diagram of a multi-microprocessor implemented mainframe data processing system which includes control and main memory storage.

An illustrative desktop mainframe data processing system 10 is shown in FIG. 1. As depicted in the simplified system block diagram thereof, a primary processing unit 12, and its associated secondary microprocessor 14 is connected to a local processor bus 18. A floating point peripheral chip 16, for example an Intel 80287, is also connected to the processor bus 18. Local bus 18 is connected, in turn, by bus-to-bus adapter 20 to the system bus 22. Main storage 24 and the secondary control storage 26 are both connected to the system bus 22. The primary processor 12, secondary processor 14 and the floating point peripheral 16 are also responsively connected to processor control logic means 28 which incorporates processor control and interface logic and some private storage therefor. Certain aspects of the control logic means 28 shall be discussed hereinafter in greater detail.

In the particular embodiment described herein, primary processor 12 is assigned the responsibility for performing all instruction fetches and operand address calculations for all of the processors used in the system. It also performs execution of all fixed point instructions, contains and maintains the general purpose registers, instruction length codes, condition codes and instruction addresses, recognizes system interrupts and provides indications to the system that a main storage instruction fetch or operand access is required. In addition, primary processor 12 is also able to provide an indication to the system that a change in processor control is needed.

Secondary processor 14 performs execution of all system control instructions and maintains all of the control registers. When necessary, it performs the service processor function and provides indications to the system of main storage operand access and private storage microcode access. In addition, secondary microprocessor 14 is able to provide the system with an indication that a change in processor control is needed.

Floating point peripheral chip 16 performs execution of all floating point instructions, containing and maintaining all of the floating point registers. It also provides the system with an indication of main storage operand access and of a need to alter microprocessor control. Alternatively, these floating point functions can be provided by a microprocessor rather than by a peripheral unit.

The mainframe instruction set is thus allocated for execution among the several processors. Primary processor 12 is provided with limited on-chip control store that can be utilized to store mainframe instruction responsive microcode and/or microprocessor interface and control microcode. It will be recognized, given the fixed quantity of on-chip control store available, that the instruction responsive microcode and the interface microcode reside in control store at the cost of the other. A greater amount of one type of microcode in on-chip control store residence means that a lesser amount of the other type can be accommodated therein. If a more functional microprocessor interface is desired, with an attendant cost in supporting microcode, there will be less room in control store for instruction responsive microcode. From a performance standpoint, it is best to keep the interface simple and leave as much control store as possible for instruction code. The present invention facilitates and makes this possible. In this embodiment, for example, it has been decided to place microcode for the most frequently used mainframe instructions in the control store of microprocessor 12 and to use a relatively simple intermicroprocessor interface that requires minimal microcode.

A main storage module 24 is attached to system bus 22 and used as needed by processors 12 and 14. It is assumed that the processor local bus 18 and microprocessors 12 and 14 all include 24 bits of addressing to accommodate the addressing structure of the mainframe to be implemented. It may be necessary to slightly modify currently available microprocessors to achieve this addressing capability. The secondary processor 14 uses off-chip control storage module 26, as may be necessary, for its own microcode and scratchpad functions. Processors 12 and 14, floating point peripheral 16 and processor control logic means 28 are interconnected together by and pass information to each other on the processor local bus 18. The microcode required by secondary microprocesor 14 is shown in source form in Appendix A in commonly assigned and copending U.S. patent application Ser. Nos. 983,024 and 983,027 should those details be needed. This appendix, which includes the code for interfacing the processors as described hereafter, is incorporated herein by reference to the extent necessary.

Because all of the available address bits or lines in a microprocessor implemented mainframe will be needed to define and emulate the mainframe's virtual storage, it would not be effective to divide all possible storage defined by the available address bits between virtual main storage and control storage. Since all of the available address lines are needed to define virtual storage, prior to calculation of the real address involved, there is no direct manner of using those same address lines to also identify unique control storage addresses. An additional address line is required and implemented to distinguish main storage from control storage accesses.

Although shown as two separate modules, and they are from a locical standpoint, main storage and control storage are a physically contiguous block of random access memory (RAM), with an exception to be discussed below. The dividing line between storage modules, as described herein, is the dividing line between real main storage and control storage. In this illustrative embodiment, the main storage module 24 runs from address 00000 to address 77FFF (hexidecimal—hereinafter hex). The control storage module 26 runs from address 78000 to address 7FFFF (hex). The addresses used herein have been selected to simplify and facilitate this description. Those having skill in this art will recognize that the address limits for each memory module are a design choice and that the manipulation of more than than one address bit, to steer between main and control storage, may be necessary.

Private store 30, referred to previously, is logically a portion of off-chip control storage 26, but is physically located in the processor control logic means 28 and mapped into a reserved segment of control store 26. The reserved segment of control store 26 is typically about 256 bytes long, although it can be greater. Private store 30 includes one unique memory mapped address for each peripheral connected to the system bus. An access of any one of these peripheral addresses will invoke a bus cycle alteration in accordance with the present invention as shall be explained below.

The processor control logic means 28 is connected to bus-to-bus interface 20 via bus feeder 18a. Also physically located in the processor control logic means 28 are a pair of override latches 32 and 34 that serve to steer memory accesses from processors 12 and 14 to either the main memory storage module 24 or to the off-chip control storage module 26, as is explained in greater detail in commonly assigned and copending U.S. patent application No. 527,053.

Synchronization of peripherals with operation of the processor in control of the system is handled in accordance with the apparatus shown in FIG. 2 and via the methodology explained hereinafter. The approach to synchronization described contemplates a change of bus cycle start or completion pending termination of peripheral operation. With respect to prior art polling techniques, this scheme has the advantage of requiring an obsolute minimum amount of host processor microcode, usually only one microword, and only a single bus cycle in which to effect synchronization. Further, without the need to wait for a polling loop to recognize peripheral readiness, performance is enhanced.

Figure 2:
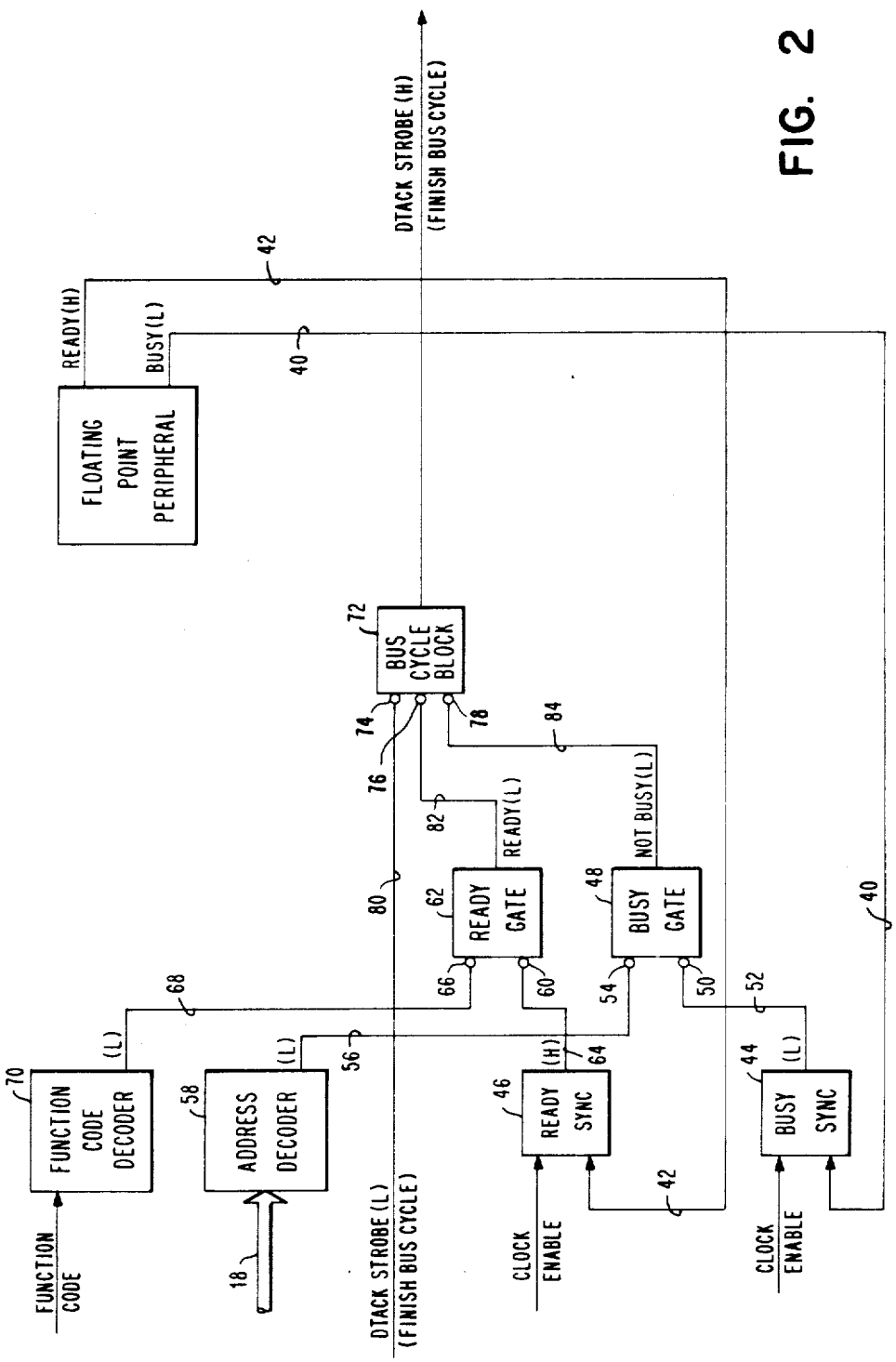
FIG. 2 schematically depicts, in greater detail and in accordance with the present invention, the peripheral synchronization circuit used in the FIG. 1 system.

Apparatus for implementing peripheral synchronization in accordance with the present invention is shown in FIG. 2. The floating point peripheral chip 16, an Intel Corporation 80287 for example, is provided with both a "busy" signal status line 40 and a "ready" signal status line 42. The "busy" signal is normally at a logical low when the floating point peripheral 16 is busy with an operation. The "ready" signal is normally at a logical high when the floating point peripheral 16 is ready to accept another operand. In order to facilitate understanding of the FIG. 2 apparatus, the normal status of a logic signal will be parenthetically indicated near the line carrying a particular signal. A logically low signal will be indicated as (L) and a logically high signal will be indicated as (H).

The floating point peripheral status lines 40 and 42 are connected respectively to signal synchronizers 44 and 46. Synchronizers 44 and 46 serve to clock the "busy" and "ready" signals through to the next logic gate upon receipt of a system clock signal. This insures that the "busy" and "ready" signals are simultaneously clocked, on the leading edge of the clock pulse in this instance, through to the succeeding logic gates.

An output of "busy" signal synchronizer 44 is connected to an inverted input 50 of AND gate 48 by output line 52. When peripheral 16 is busy, output 52 will at a logical low, but AND gate input 50 will see that signal as a logical high due to input inversion. Conversely, when peripheral 16 is not busy, signal lines 40 and 52 will be at a logical high, which sets input 50 to busy gate 48 to a logical low. This sets the output of busy gate 48 to a logical low whenever peripheral 16 is not busy.

Inverted input 54 of busy gate 48 is connected to output line 56 of address decoder 58. Decoder 58 "looks" at the addresses on bus 18 and sets its output line 56 to a logical low whenever it determines that the mapped memory address reserved for peripheral 16 is being accessed. If signal line 56 is set to a logical low, then input 54 to busy gate 48 will be set high as a result of the inversion. Conversely, input 54 of busy gate 48 will always be at a logical low if peripheral 16 has not been addressed. Thus, if peripheral 16 is busy and has been addressed, both inputs to busy gate 48 will be at a logical high and the gate will be enabled setting its output under these conditions to a logical high. Under all other input conditions, the output of busy gate 48 will be at a logical low.

An output of "ready" signal synchronizer 46 is connected to an inverted input 60 of ready gate 62 by signal line 64. When peripheral 16 is ready, output 64 will at a logical high, but AND gate input 60 will see that signal as a logical low due to input inversion. Conversely, when peripheral 16 is not ready, signal lines 42 and 64 will be at a logical low, which sets input 60 of ready gate 62 to a logical high.

Inverted input 66 of ready gate 62 is connected to output line 68 of function decoder 70. Decoder 70 "looks" at the function codes on its input and sets its output line 68 to a logical low whenever it determines that the function codes seen there have called for an operand transfer to be performed by the peripheral in question. If signal line 68 is set to a logical low, then input 66 to ready gate 62 will be set high due to the inversion effect at that input. Conversely, input 66 of ready gate 62 will always be at a logical low if the function provided by peripheral 16 has not been invoked, i.e., if signal line 68 is set to a logical high. Thus, if peripheral 16 is not ready and has been functionally invoked, both inputs to ready gate 62 will be set at a logical high and the gate will be enabled setting its output under these conditions to a logical high.

Bus cycle blocking AND gate 72 is provided with three inverted inputs 74, 76 and 78. DTACK signal line 80, which is active low, carries a "data transfer acknowledgment" signal or DTACK which indicates, when received by the microprocessor 12, that the current bus cycle can now be completed. Whenever the active low DTACK signal is received, input 74 of blocking gate 72 is set to a logical high. It should be noted that a delay or block of the DTACK signal will inhibit or block completion of the current bus cycle.

Output line 82 from ready gate 62 is connected to the second input 76 of blocking gate 72. As previously noted, when the associated peripheral is not ready for an operation and the peripheral has been functionally invoked, the output of ready gate 62 is logically high. Inversion at input 76 of blocking gate 72 sets that input to a logical low and thereby disables gate 72. Thus, if an associated peripheral is not ready, blocking gate 72 is disabled and the next bus cycle is delayed until at least the output of ready gate 62 is set to a logical low, i.e., the peripheral is ready to accept a task.

Output line 84 from busy gate 48 is connected to the third input 78 of blocking gate 72. As previously noted, when the associated peripheral is busy and cannot accept a new task and the peripheral has been addressed, the output of busy gate 48 will be set at a logical high. Inversion at input 78 of blocking gate 72 sets that input to a logical low and thereby disables gate 72. Thus, if an associated peripheral is busy, blocking gate 72 is disabled and the next bus cycle is delayed until at least the output of busy gate 48 is set to a logical low, i.e., the peripheral is not busy and is able to accept a task.

Thus, in order to block completion of the current bus cycle, in lieu of polling, the logic merely tests to see if a peripheral of interest is busy or not ready. Either one of these two conditions blocks the DTACK signal from reaching the microprocessor 12 where it would indicate completion of the current bus cycle. When the peripheral is not busy and ready to accept a new task, the logic tests to insure that condition and allows the DTACK signal to be forwarded to microprocessor 12. It will be appreciated by those having skill in the appertaining art that blocking of the DTACK signal, or any other system control signal of interest, is an OR function with respect to the not ready and busy status of an associated peripheral. This should be contrasted with the logic conditions that need be present in order to pass the DTACK signal on without further delay, an AND function with respect to the not busy and ready status of an associated peripheral.

In all data processing systems, bus cycles are initiated by generating an address strobe or similar signal. It will be appreciated by those having skill in this art that only the busy condition of a peripheral is needed or is necessary to effect peripheral synchronization, the use of the ready status to block bus cycle completion being ancillary thereto. In the embodiment described above, completion of the current bus cycle is delayed in response to the sensed busy or not ready condition of an associated peripheral. Quite simply, completion of the present busy cycle is blocked or delayed until that peripheral is no longer busy or finishes its assigned task.

It is also possible to adapt the logic so that initiation of the present bus cycle, the one in which peripheral action is initiated, is itself delayed until the peripheral is logically deemed able to accept another task or is considered finished with the present one. That is done by blocking or delaying the address strobe signal, thereby delaying the start of the current bus cycle, rather than by blocking or delaying bus cycle completion by blocking the DTACK signal. To implement this approach, one need only substitute the address strobe signal for the DTACK signal connected to input 74 of blocking gate 72. Thus, modification of the current bus cycle can be accomplished by blocking or intercepting any appropriate bus control signal, which for purposes of this description would be the DTACK or address strobe signals, for example.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. In a data processing system including a system bus, a processor means connected to the system bus, a peripheral device connected to the system bus, a storage means connected to the system bus for storing an address indicative of said peripheral device, and an apparatus connected to said processor means and to said peripheral device for determining if said peripheral device is busy or not ready and for placing said processor means in a waiting state when said peripheral device is busy or not ready, said processor means retrieving said address from said storage means and placing said address on said system bus when an access to said peripheral device during a current bus cycle is desired, said processor means developing a function code output signal when an access to said peripheral device during a subsequent bus cycle is desired, said processor means developing a strobe bus cycle signal representative of an attempt by said processor means to access said peripheral device, said peripheral device developing a ready signal when said peripheral device is ready to accept an operand and a busy signal when said peripheral device is busy performing an operation, a method for determining if said peripheral device is busy or not ready and for placing said processor means in a waiting state when said peripheral device is busy or not ready, comprising the steps of:
- receiving said ready signal from said peripheral device and said function code output signal from said processor means, developing a not ready signal when the value of said ready signal indicates that said
- ready signal is not received and when the value of said function code output signal indicates that said function code output signal is received, and developing a further ready signal when the value of said ready signal indicates that said ready signal is received and the value of said function code output signal indicates that said function code output signal is not received;
- receiving said busy signal from said peripheral device and said address from said system bus, developing a further busy signal when the value of said busy signal indicates that said busy signal is received and when said address is received, and developing a not busy signal when the value of said busy signal indicates that said busy signal is not received and when said address is not received; and
- receiving either said not ready signal or said further ready signal, either said further busy signal or said not busy signal, and said strobe bus cycle signal and blocking a further development of said strobe bus cycle signal in response to said not ready signal or said further busy signal, said strobe bus cycle signal being further developed in response to said further ready signal and said not busy signal, said processor means accessing said peripheral device in response to said strobe bus cycle signal and being placed in said waiting state when the further development of said strobe bus cycle signal is blocked.

2. A data processing system including a system bus, a processor means connected to the system bus, a peripheral device connected to the system bus, a storage means connected to the system bus for storing an address representative of said peripheral device, and an apparatus connected to said processor means and to said peripheral device for determining if said peripheral device is busy or not ready and for placing said processor means in a waiting state when said peripheral device is busy or not ready, said processor means retrieving said address from said storage means and placing said address on said system bus when an access to said peripheral device during a current bus cycle is desired, said processor means developing a function code output signal when an access to said peripheral device during a subsequent bus cycle is desired, said processor means developing a strobe bus cycle signal representative of an attempt by said processor means to access said peripheral device, said peripheral device developing a ready signal when said peripheral device is ready to accept an access and a busy signal when said peripheral device is busy with an operation, said apparatus comprising:

- first means responsive to said function code output signal from said processor means and to said ready signal from said peripheral device for developing a further ready signal when said ready signal indicates said peripheral device is ready to accept said access and said function code output signal indicates said operation is not to be performed by said peripheral device;
- second means responsive to the presence or absence of said address on said system bus and to said busy signal from said peripheral device for developing a not busy signal when said address has not been placed on said system bus by said processor means and said busy signal indicates said peripheral device is not busy with said operation; and
- third means responsive to said further ready signal, to said not busy signal, and to said strobe bus cycle signal for further developing said strobe bus cycle signal in response to said further ready signal and said not busy signal and for blocking the further development of said strobe bus cycle signal in response to the absence of either said further ready signal or said not busy signal,
- said processor means being placed in said waiting state when the further development of said strobe bus cycle signal is blocked.

3. The apparatus of claim 2, wherein said first means comprises:
- ready sync means responsive to said ready signal from said peripheral device and to a clock enable signal for developing an intermediate ready signal when said ready signal is developed simultaneously with an edge of said clock enable signal; and
- ready gate means responsive to said intermediate ready signal and to said function code output signal for developing said further ready signal in response to said intermediate ready signal and said function code output signal indicating said operation is not to be performed by said peripheral device.

4. The apparatus of claim 3, wherein said second means comprises:
- busy sync means responsive to said busy signal from said peripheral device and to said clock enable signal for developing an intermediate busy signal when said busy signal is developed simultaneously with an edge of said clock enable signal; and
- busy gate means responsive to said intermediate busy signal and to said address on said system bus for developing said not busy signal in response to the absence of said intermediate busy signal and to the absence of said address on said system bus.

5. The apparatus of claim 4, wherein said intermediate ready signal and said intermediate busy signal are developed simultaneously in response to the energization of said ready sync means and said busy sync means by said clock enable signal.

* * * * *